US009198205B2

(12) United States Patent
Horneman et al.

(10) Patent No.: US 9,198,205 B2
(45) Date of Patent: Nov. 24, 2015

(54) APPARATUS AND METHOD FOR COMMUNICATION

(75) Inventors: Kari Veikko Horneman, Oulu (FI); Vinh Van Phan, Oulu (FI); Simone Redana, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 32 days.

(21) Appl. No.: 14/110,251

(22) PCT Filed: Apr. 6, 2011

(86) PCT No.: PCT/EP2011/055366
§ 371 (c)(1),
(2), (4) Date: Oct. 21, 2013

(87) PCT Pub. No.: WO2012/136254
PCT Pub. Date: Oct. 11, 2012

(65) Prior Publication Data
US 2014/0038582 A1    Feb. 6, 2014

(51) Int. Cl.
*H04W 76/02* (2009.01)
*H04B 7/26* (2006.01)

(52) U.S. Cl.
CPC ............ *H04W 76/02* (2013.01); *H04B 7/2606* (2013.01)

(58) Field of Classification Search
CPC ..... H04W 76/02; H04W 36/04; H04W 88/04; H04W 36/14; H04B 7/15
USPC ............... 455/418, 426.1, 450; 370/315, 331
See application file for complete search history.

(56) References Cited

U.S. PATENT DOCUMENTS

2011/0274031 A1\* 11/2011 Gaal et al. ............... 370/315
2013/0040558 A1\* 2/2013 Kazmi ...................... 455/9
2013/0322395 A1\* 12/2013 Kazmi et al. ............. 370/329

OTHER PUBLICATIONS

Van Phan, V., et al., "Providing enhanced cellular coverage in public transportation with smart relay systems", Vehicular Networking Conference (VNC), 2010 IEEE, abstract.
Teyeb, O., et al., "Dynamic Relaying in 3GPP LTE-Advanced Networks", Hindawi Publishing Corporation, EURASIP Journal on Wireless Communications and Networking, vol. 2009, 11 pgs.
(Continued)

*Primary Examiner* — Phuoc H Doan
(74) *Attorney, Agent, or Firm* — Harrington & Smith (57) ABSTRACT

Apparatus and method for communication are provided. The solution includes controlling a relay node to provide an out-band wireless service; setting up and maintaining a first connection with a primary radio access network of a donor cellular system supporting in-band cellular access relays, setting up and maintaining a second connection with a radio access network of a radio cellular system, the second connection providing a mobile backhaul connection for the out-band wireless service, and the first connection carrying control signalling required to control and manage the first and second connection and the out-band wireless service.

40 Claims, 3 Drawing Sheets

(56) References Cited

OTHER PUBLICATIONS

3GPP TSG RAN WG1 #58bis, Miyazaki, Japan, Oct. 12-16, 2009, R1-094315, "common R-PDCCH in Control Channel for Backhaul Link", LG-Nortel, 3 pgs.

IEEE Std 802.11n-2009 (Amendment to IEEE Std 802.11-2007 as amended by IEEE Std 802.11k-2008, IEEE Std 802.11r-2008, IEEE Std 802.11y-2008, and IEEE Std 802.11w-2009) "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput"; IEEE Computer Society; Sponsored by the LAN/MAN Standards Committee; IEEE; 3 Park Avenue; New York; NY 10016-5997; USA; Oct. 29, 2009; pp. 1-536.

* cited by examiner

APPARATUS AND METHOD FOR
COMMUNICATION

FIELD

The exemplary and non-limiting embodiments of the invention relate generally to wireless communication networks. Embodiments of the invention relate especially to an apparatus and a method in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

With the ever increasing demand for increasing data rates and higher quality services in the world of mobile communications comes ever increasing demand for better performance of cellular network infrastructures. People use their mobile equipment with support for high data rate services while they are at work, at home, and/or while traveling on a mass transportation vehicle, e.g. bus, train, and ship. Such a mass transportation vehicle may travel at a speed of up to 100 m/s, and a huge number of communicating mobile devices in the vehicle traveling at the same speed sets high demands for network operators, because the users wish to preserve their high data rate connections regardless of the speed of the vehicle.

Long-term evolution (LTE) of the 3rd generation mobile communication system standardized within 3GPP (3rd Generation Partnership Project) has introduced a relayed extension to cellular network infrastructure. Relaying links between user terminals and conventional base stations through mobile relays or relaying base stations improves capacity, coverage, and data rates. The mobile relays may be installed in buses, trains, cruisers and other mass transportation vehicles.

One problem associated with supporting mobile relay systems is the need of providing and ensuring sufficiently high data rates for the mobile wireless backhaul connections, also referred to as relay links, between a mobile relay system and donor cellular systems which are changing in time due to the mobility of the mobile relay system. The fair sharing of limited radio resources of the donor cellular systems with other regular mobile users needs to be solved as well.

In addition, there is the need for the mobile relay system to support all mobile users aboard, regardless of their associated home operators, also referred to as the multi-operator problem.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising: at least one processor; and at least one memory including computer program code, the at least one memory and the computer program code configured to, with the at least one processor, cause the apparatus at least to perform: control a relay node to provide an out-band wireless service; setup and maintain a first connection with a primary radio access network of a donor cellular system supporting in-band cellular access relays, setup and maintain a second connection with a radio access network of a donor cellular system, the second connection providing a mobile backhaul connection for the out-band wireless service, and the first connection carrying control signalling required to control and manage the first and second connection and the out-band wireless service.

According to an aspect of the present invention, there is provided an apparatus, comprising: means for controlling a relay node to provide an out-band wireless service; means for setting up and maintaining a first connection with a primary radio access network of a donor cellular system supporting in-band cellular access relays, means for setting up and maintaining a second connection with a radio access network of a donor cellular system, the second connection providing a mobile backhaul connection for the out-band wireless service, and the first connection carrying control signalling required to control and manage the first and second connection and the out-band wireless service.

According to an aspect of the present invention, there is provided an apparatus, comprising: at least one processor; and at least one memory including computer program code, the at least one memory and the computer program code configured to, with the at least one processor, cause the apparatus at least to perform: controlling the establishment of a network connection to a relay node; controlling the setup of a first connection with the relay node and a primary radio access network of a donor cellular system supporting in-band cellular access relays, controlling the setup of a second connection with the relay node and a radio access network of a donor cellular system; the second connection providing a mobile backhaul connection for the out-band wireless service, and the first connection carrying control signalling required to control and manage the first and second connection and the out-band wireless service.

According to an aspect of the present invention, there is provided an apparatus, comprising: means for controlling the establishment of a network connection to a relay node; and means for controlling the setup of a first connection with the relay node and a primary radio access network of a donor cellular system supporting in-band cellular access relays, means for controlling the setup of a second connection with the relay node and a radio access network of a donor cellular system; the second connection providing a mobile backhaul connection for the out-band wireless service, and the first connection carrying control signalling required to control and manage the first and second connection and the out-band wireless service.

According to another aspect of the present invention, there is provided a method comprising: controlling a relay node to provide an out-band wireless service; setting up and maintaining a first connection with a primary radio access network of a donor cellular system supporting in-band cellular access relays, setting up and maintaining a second connection with a radio access network of a donor cellular system, the second connection providing a mobile backhaul connection for the out-band wireless service, and the first connection carrying control signalling required to control and manage the first and second connection and the out-band wireless service.

According to another aspect of the present invention, there is provided a method comprising: controlling the establishment of a network connection to a relay node; controlling the setup of a first connection with the relay node and a primary radio access network of a donor cellular system supporting in-band cellular access relays, controlling the setup of a second connection with the relay node and a radio access network of a donor cellular system; the second connection providing a mobile backhaul connection for the out-band wireless service, and the first connection carrying control signalling required to control and manage the first and second connection and the out-band wireless service.

LIST OF DRAWINGS

Embodiments of the present invention are described below, by way of example only, with reference to the accompanying drawings, in which.

DESCRIPTION OF SOME EMBODIMENTS

Embodiments are applicable to any base station, user equipment, server, corresponding component, and/or to any communication system or any combination of different communication systems that support required functionality. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), Wireless Local Area Network (WLAN) based on IEEE 802.11 standard, worldwide interoperability for microwave access (WiMAX), Bluetooth®, personal communications services (PCS) and systems using ultra-wideband (UWB) technology. IEEE refers to the Institute of Electrical and Electronics Engineers.

Figure 1:
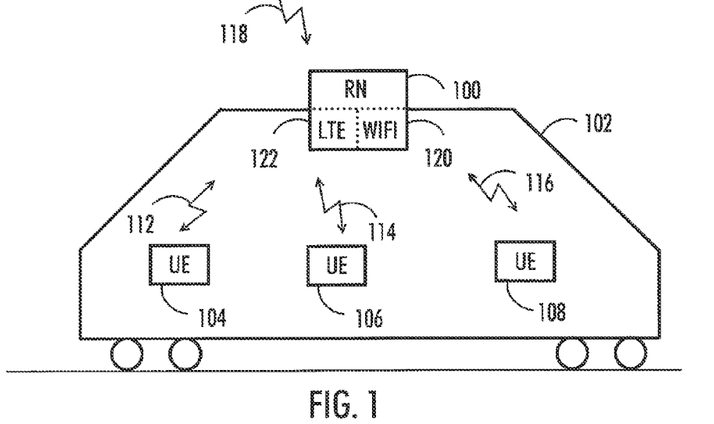
FIG. 1 illustrates an example of an environment where mobile relays are used.

FIG. 1 illustrates an example of an environment where mobile relays are used between user terminals and a telecommunication system. In the illustrated scenario, a mobile relay or a relay base station is installed in a mobile vehicle and configured to relay communication links between fixed network infrastructure and user terminals. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures.

The example of FIG. 1 shows a relay node 100 installed in a mobile vehicle 102. The mobile relay 100 is configured to provide network access to user terminals 104, 106 and 108 in the moving vehicle. Thus, it serves a moving cell. The user terminals are connected 112, 114 and 116 to the mobile relay 100. The relay node 100 is connected 118 to a core network of a donor cellular system by means of a mobile wireless backhaul connection.

A user terminal refers to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

The relay node 100 may comprise a wireless transceiver 120 providing an out-band wireless access for the terminals in the coverage area of the relay node. The out-band wireless access may also be called non-cellular radio access as the frequency band utilised by the out-band wireless access is different compared to cellular services. A non-limiting example of a non-cellular or out-band access type is Wireless Local Area Network (WLAN) or WiFi.

In an embodiment, the mobile relay 100 may comprise a cellular transceiver 122 providing a cellular wireless access for the terminals in the coverage area of the mobile relay. The access technology may be LTE or LTE-A, for example. The mobile relay 100 may have the full functionality of e.g. LTE-A eNode B towards the user equipment 104, 106, 108 but it is attached to the network side using a mobile wireless backhaul.

Figure 2:
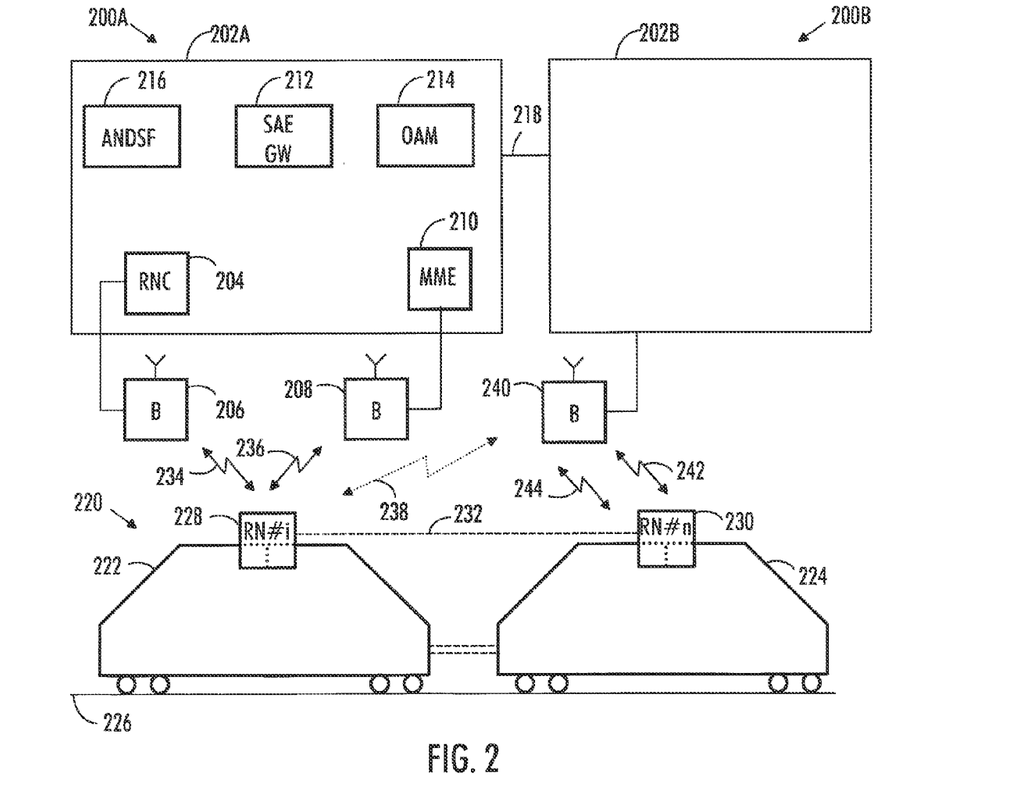
FIG. 2 illustrates an example of a communication environment between a relay node and communication systems.

FIG. 2 illustrates an example of a communication environment between a relay node 228 and communication systems. FIG. 2 is a simplified system architecture only showing some elements and functional entities, all being logical units whose implementation may differ from what is shown. The connections shown in FIG. 2 are logical connections; the actual physical connections may be different. It is apparent to a person skilled in the art that the systems also comprise other functions and structures. It should be appreciated that the functions, structures, elements, and protocols used in or for group communication are irrelevant to the actual invention. Therefore, they need not be discussed in more detail here.

The example of FIG. 2 comprises two communication systems 200A, 200B of two operators. Each network comprises a core network 202A, 202B. In this example, system 200A comprises more than one radio access network of different radio access technologies (RAT). The system comprises a 3G based network comprising a Radio Network Controller RNC 204 and one or more base stations or NodeBs 206 connected to the RNC 204. In addition, the system comprises LTE or LTE-A based access network comprising eNodeB 208 connected to a MME (Mobility Management Entity) 210 of the core network 202A.

The core networks of the operators comprise following elements: an MME (Mobility Management Entity) 210, an SAE GW (SAE Gateway) 212, and an OAM (Operations, Administration and Management system) 214. The core network further comprises an ANDSF (Access Network Discovery and Selection Function) 216. It should be appreciated that a communication system may also comprise other core network elements besides the illustrated such as a Gateway Mobile Service Switching Centre, GMSC, a Serving GPRS Support Node, SGSN, for example. Furthermore, not all systems necessarily comprise all the above illustrated elements.

Base stations that may also be called eNodeBs (Enhanced node Bs) of a communication system may host the functions for Radio Resource Management: Radio Bearer Control, Radio Admission Control, Connection Mobility Control, Dynamic Resource Allocation (scheduling). This applies to LTE or LTE-A based systems. For the 3G based systems the Radio Network Controller 204 may comprise some of the above mentioned functions. The MME 210 is responsible for distributing paging messages to the eNodeBs. The SAE GW 212 is an entity configured to act as a gateway between the network and other parts of communication network such as the Internet for example. The SAE GW may be a combination of two gateways, a serving gateway (S-GW) and a packet data network gateway (P-GW). The ANDSF 216 is a network-protocol functionality which is configured to assist user equipment of the network to make mobility decisions between 3GPP and non-3GPP access technologies on the basis of the network operator policy. For example, the ANDSF enables user equipment supporting multiple access technologies to select most suitable access network in the area where different access technologies such WLAN or WiMAX are available.

Each communication system 200A, 200B of an operator is operated as a closed system from radio network management point of view. The networks of different operators are connected with each other using a Global Roaming Interface (GRX) 218. The systems 200A, 200B may be roaming partners allowing visiting user equipment of another network to get service. Visiting user equipment is authenticated from the home network of the user equipment.

FIG. 2 only illustrates a simplified example. In practice, the network may include more base stations and more cells may be formed by the base stations. The networks of two or more operators may overlap, the sizes and form of the cells may vary from what is depicted, etc.

The embodiments are not restricted to the network given above as an example, but a person skilled in the art may apply the solution to other communication networks provided with the necessary properties. For example, the connections between different network elements may be realized with Internet Protocol (IP) connections.

In the example of FIG. 2, a vehicle 220 comprising one or more section or car 222, 224 is travelling on a path 226. Each car comprises a relay node 228, 230. The mobile relay may be a dual function relay as in FIG. 1 providing both LTE/LTE-A access and non-cellular wireless access or the relays may offer only the latter access for the passengers of the vehicle. The mobile relays 228, 230 may be connected with a crX2 interface 232.

In an embodiment, the relay nodes 228, 230 are configured to operate in co-operation. The relay nodes may communicate with each other using the interface 232 regarding the wireless access services provided by the relay nodes and the backhaul connections of the relay nodes. A system comprising or more co-operative relay nodes may also be called a mobile relay.

Consider an embodiment where a mobile relay or a relay node provides a car a non-cellular or out-band wireless access. The mobile relay is configured to setup and maintain a first connection with a primary radio access network of a donor cellular system supporting in-band cellular access relays. An example of such is LTE or LTE-A network. In addition, the mobile relay is configured to setup and maintain a second connection with a radio access network of a donor cellular system. The connections may be set up with a same or different radio access network, donor system or operator. The second connection is configured to provide a mobile backhaul connection for the out-band wireless service, and the first connection configured to carry control signalling required to control and manage the first and second connection and the out-band wireless service.

The communication system comprises a network element configured to control the establishment of a network connection to the mobile relay and control the setup of the first connection with a LTE or LTE-A core network and the moving relay, the connection carrying control signalling required by the mobility management and control of a non-cellular wireless service provided by the moving relay. In an embodiment, the network element Access Network Discovery and Selection Function ANDSF 216 provides the above features. The ANDSF 216 or other network element may be configured to assist in coordinating and controlling on-the-run Self-Organizing Network (SON) and Flexible Spectrum Usage (FSU) based deployment of mobile relays including mobile backhaul connection re/-establishment and mobility management.

In the example of FIG. 2, the relay node 228 provides the car 222 at least a non-cellular or out-band wireless access such as WLAN or WiFi. The mobile relay sets up a first connection 236 with the LTE/LTE-A eNodeB 208. In addition, the relay node sets up a second connection 234 with the 3G eNodeB 206. The second connection provides a wireless backhaul connection of the out-band access. The first connection is used to carry control signalling required by the mobility management and control of the mobile relay out-band wireless service. In this case, the connections are with the communication system 200A of a same operator. Instead of or in addition to connection 236, the relay node may setup and maintain a connection 238 with the LTE/LTE-A eNodeB 240 of another operator's communication system 200B for carrying the control signalling.

Respectively, the relay node 230 sets up a first connection 242 and a second connection 244 for providing a mobile backhaul connection of an out-band wireless service provided by the relay node 230. In this example both first and second connections are with the same radio access network.

In an embodiment where the mobile relay 228 is configured to act as a dual function relay as in FIG. 1 providing an LTE/LTE-A wireless access in addition to the non-cellular wireless access, the first connection 236 or 238 or a connection 242 of a cooperating relay node 230 with a LTE or LTE-A network may be configured to provide a mobile backhaul connection for the mobile relay LTE/LTE-A wireless access service.

Thus, the connection mobility management and control of the non-cellular or out-band transport backhaul connection is primarily tied to active first mobile relay backhaul connection 236. This means that relevant control signalling on the out-band transport backhaul connection is coordinated between involved donor systems and carried over the mobile relay backhaul connection thus avoiding or at least minimizing the need of a separate control-plane radio bearer services associated with the non-cellular transport backhaul connection 234.

A mobile relay comprising several interconnected cooperative relay nodes may comprise several first and second connections. In an embodiment, the mobile relay may transmit both user data and control data of a given relay node through another interconnected relay node in whole or in part.

In an embodiment, the mobile relay may be configured to suspend the second connection 234 acting as the out-band or non-cellular transport backhaul connection for a given time period by releasing and re-establishing the connection, during which time period the uplink data of the out-band or non-cellular wireless service may be buffered at the mobile relay and downlink data at the serving base station. This procedure may be applied for example at cell borders where the mobile relay will perform handover. The suspension of the connection provides a method for avoiding the handover procedure. As relevant control signalling is provided by the first connection 236 the suspension does not have any effect on mobility management issues. In an embodiment, the mobile relay may be configured to transmit at least part of traffic of the mobile relay non-cellular or out-band wireless service using the first connection 236. The non-cellular or out-band traffic may be transmitted over the mobile relay backhaul connection 236 if scheduled by the donor cellular system upon request from the mobile relay (explicit or implicit based on status reporting about out-band or non-cellular traffic to the donor cellular system, for example) or request from another involved cellular system providing the dedicated non-cellular backhaul connection or from relevant coordinated and control network entity such as the ANDSF 216. In an embodiment, a relay node may have more than one IP connections established with ANDSF 216 or respective network element via the backhaul connections realized using possibly different access technologies and/or via different operators. In the example of FIG. 2, the relay node 228 may have IP connections with the ANDSF via the out-band or non-cellular backhaul connection 234 and the mobile backhaul connection 236 or 238. The ANDSF 216 or respective network element may communicate with serving MME 210 and/or serving RNC 204 of involved cellular systems and provide coordination and control for mobile backhaul connection mobility management and capacity sharing.

The ANDSF 216 or respective network element may be configured to assist in the transmission of system information and control signalling to the mobile relay via established connection(s) for serving access network and packet data network selection and reselection. In addition, assistance may be provided for possible handover or recovery from a radio link failure of a backhaul connection, regarding either the backhaul connection for non-cellular access or mobile backhaul connection for LTE-A relaying.

When a mobile relay comprises several interconnected cooperative relay nodes as illustrated in FIG. 2 each relay node may have one or more connections to ANDSF or respective network elements.

In an embodiment, the ANDSFs or respective network elements of involved communication systems coordinate the connections of the relay nodes serving the same vehicle. For example, the relay nodes and the network elements may communicate with each other regarding the status of one or more backhaul connections. Handover modes, handover thresholds or timers for an individual backhaul connection of a relay node may be adjusted depending on status of the other mobile backhaul connections, as handover control information of the backhaul connection in question may be communicated via one of the other available relay backhaul connections. For example consider a long train comprising several cars with a relay node in each car. When the first car enters the border area of two cells and the backhaul connections performs a handover to a new cell, information about the handover may be communicated to the relay nodes serving the other cars. This way the relay nodes and the network may prepare for the coming handovers.

In an embodiment, the ANDSFs or respective network elements of involved communication systems are configured to communicate status information of active mobile backhaul connections and necessary configuration thereof with relay nodes serving the same vehicle to enable backhaul capacity sharing among available mobile backhaul connections. Thus, if there are large variations in the number of user terminals within different cars of a train, the backhaul traffic load may be distributed evenly between the relay nodes serving the train.

Figure 3A:
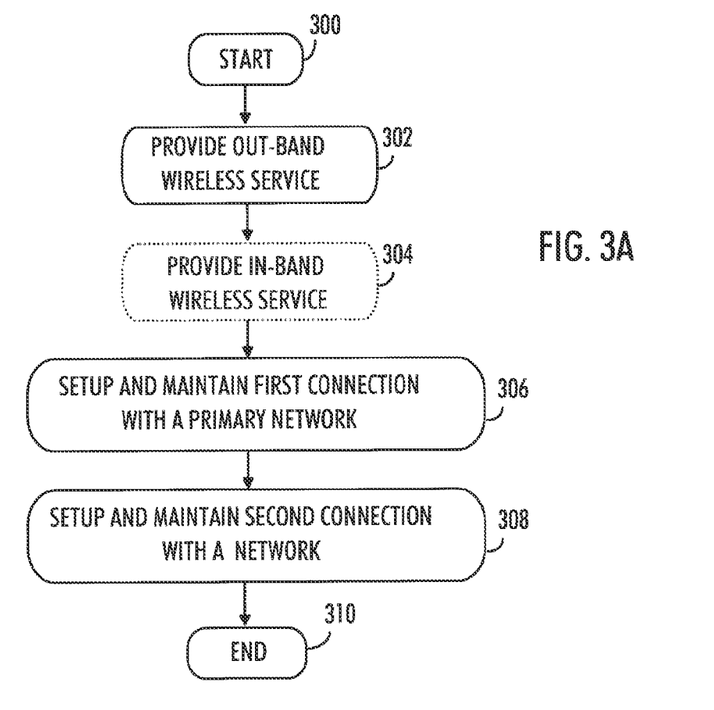
FIGS. 3A and 3B are flowcharts illustrating embodiments of the invention.

FIG. 3A is a flowchart illustrating an embodiment of the invention. The embodiment starts at step 300.

In step 302, a moving relay is controlled to provide a non-cellular wireless service in a moving vehicle, for example.

In some embodiments, a relay node is controlled to provide a cellular wireless service in step 304.

In step 306, a first connection with a primary network of a donor system is setup and maintained. The primary network may be an LTE or LTE-A network. The connection is configured to carry control signalling required by the mobility management and control of the relay node out-band or non-cellular wireless service. In some embodiments, the first connection is configured to provide a backhaul connection for the cellular wireless service.

At least one second connection with a radio access network is setup and maintained in step 308. The connection is configured to provide a mobile backhaul connection for the out-band or non-cellular wireless service. The process ends in step 310.

Figure 3B:
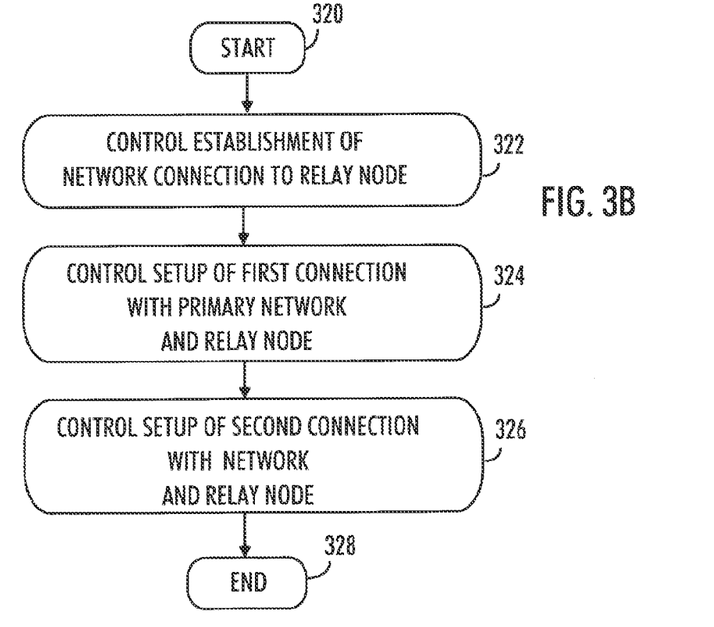

FIG. 3B is a flowchart illustrating an embodiment of the invention. The embodiment starts at step 320.

In step 322, the establishment of a network connection to a relay node is controlled.

In step 324, the setup of a first connection with a primary network and the relay is controlled. The primary network may be an LTE or LTE-A network. The connection is configured to carry control signalling required by the mobility management and control of an out-band or non-cellular wireless service provided by the relay node. In some embodiments, the first connection is configured to provide a backhaul connection for a cellular wireless service provided by the relay node.

The setup of at least one second connection with a radio access network and the relay node is controlled in step 326. The connection is configured to provide a backhaul connection for a non-cellular wireless service provided by the mobile relay. The process ends in step 328.

Figure 4A:
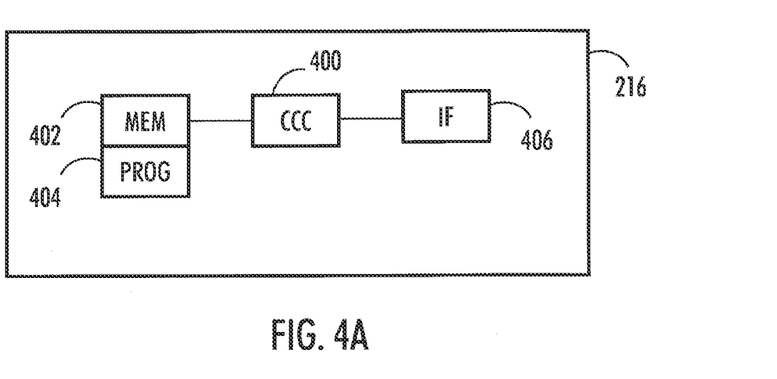
FIGS. 4A and 4B illustrate examples of apparatuses according to embodiments of the invention.

FIG. 4A illustrates a simplified example of an apparatus 216 of an embodiment. In some embodiments, the apparatus may be an ANDSF of a communications system. In an embodiment, it is a separate network element.

It should be understood that the apparatus is depicted herein as an example illustrating some embodiments. It is apparent to a person skilled in the art that the apparatus may also comprise other functions and/or structures. Although the apparatus has been depicted as one entity, different modules and memory may be implemented in one or more physical or logical entities.

The apparatus of the example includes a communication control circuitry 400 configured to control at least part of the operation of the apparatus.

The apparatus may comprise a memory 402 for storing data. Furthermore the memory may store software 404 executable by the control circuitry 400. The memory may be integrated in the control circuitry. The software may comprise a computer program comprising program code means adapted to perform any of features described above in relation to the network element 216.

The apparatus may further comprise interface circuitry 406 configured to connect the apparatus to other devices of communication network, for example to core network. The interface may provide a wired or wireless connection to the communication network. The apparatus may be in connection with a mobile relay, relay node, core network elements and with respective apparatuses of communication systems of other operators.

Figure 4B:
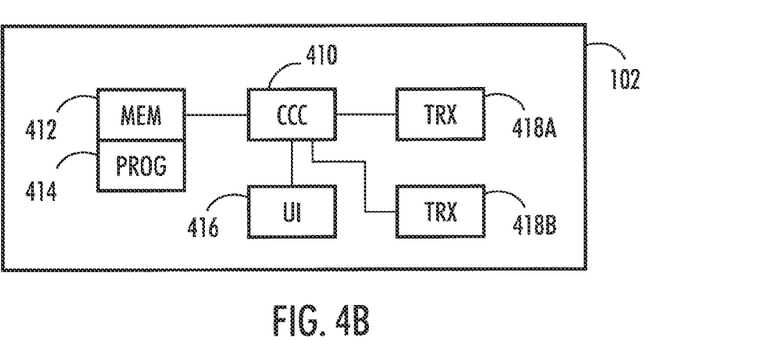

FIG. 4B illustrates a simplified example of a relay node 228. It should be understood that the apparatus is depicted herein as an example illustrating some embodiments. It is apparent to a person skilled in the art that the mobile relay node may also comprise other functions and/or structures. Although the relay node has been depicted as one entity, different modules and memory may be implemented in one or more physical or logical entities.

The relay node may be implemented in part or in whole as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The electronic digital computer may also have an operating system, which may provide system services to a computer program written with the program instructions. The relay node of the example includes a communication control circuitry 410 configured to control at least part of the operation of the mobile relay node.

The relay node further comprises a first transceiver 418A configured to provide a non-cellular or out-band wireless access service. The transceiver may be a WLAN or WiFi transceiver, for example. The transceiver is operationally connected to the control circuitry 410. It may be connected to an antenna arrangement (not shown).

The relay node further comprises a second transceiver 418B configured to provide a cellular wireless access service or in-band cellular access communication as well as the access backhaul links. The transceiver may be a LTE or LTE-A transceiver. The transceiver is operationally connected to the control circuitry 410. It may be connected to an antenna arrangement (not shown).

The transceivers may be separate entities in the relay node 228 or they may be realized as circuitries in a common transceiver. In addition, the number of transceivers or circuitries is not limited. There may be separate circuitries providing the backhaul links and the access services, for example. The transceivers or circuitries may have separate antenna arrangements or they may use the same antenna arrangement.

As one skilled in the art is aware, transceivers may be realized as separate transmitters and receivers.

The apparatus may further comprise a memory 412 for storing data. Furthermore the memory may store software 414 executable by the control circuitry 410. The memory may be integrated in the control circuitry. The software may comprise a computer program comprising program code means adapted to perform any of features described above in relation to the mobile relay 228.

In an embodiment, the apparatus may further comprise user interface 416 with which the apparatus may be configured by hand if need arises. The user interface may comprise a display and a keypad or keyboard, for example.

The steps, messages and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, an electrical carrier signal, a telecommunications signal, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claims.

The invention claimed is:
1. An apparatus, comprising:
at least one processor; and
at least one memory including computer program code, the at least one memory and the computer program code configured to, with the at least one processor, cause the apparatus at least to:

control a relay node to provide a non-cellular wireless service;

setup and maintain a first connection providing a cellular connection with a primary radio access network of a donor cellular system supporting cellular wireless service access relays;

setup and maintain a second connection providing a mobile backhaul connection with a radio access network of a donor cellular system;

the second connection providing the mobile backhaul connection for the non-cellular wireless service; and the first connection carrying control signalling required to control and manage the first connection, the second connection, and the non-cellular wireless service.

2. The apparatus of claim 1, where the at least one memory including the computer program code is configured with the at least one processor to cause the apparatus to control the relay node to provide the cellular wireless service and provide with the first connection a mobile backhaul connection for the cellular wireless service.

3. The apparatus of claim 1, where the at least one memory including the computer program code is configured with the at least one processor to cause the apparatus to set up the first connection and the second connection with radio access networks using different radio access technologies.

4. The apparatus of claim 1, where the at least one memory including the computer program code is configured with the at least one processor to cause the apparatus to set up the first connection and the second connection with donor cellular systems of different operators.

5. The apparatus of claim 1, wherein the primary radio access network is a Long-Term Evolution (LTE) or Long-Term Evolution-Advanced (LTE-A) network.

6. The apparatus of claim 1, where the at least one memory including the computer program code is configured with the at least one processor to cause the apparatus to suspend the second connection for a given time period by releasing and re-establishing the connection, during which time period the apparatus is configured to buffer uplink data of the non-cellular wireless service at the relay node.

7. The apparatus of claim 1, where the at least one memory including the computer program code is configured with the at least one processor to cause the apparatus to transmit at least part of traffic of the mobile relay non-cellular wireless service using the first connection.

8. The apparatus of claim 1, where the at least one memory including the computer program code is configured with the at least one processor to cause the apparatus to communicate with an Access Network Discovery and Selection Function of a donor cellular system for controlling the activation, reactivation and setup of the connections of the apparatus with donor cellular systems.

9. The apparatus of claim 8, where the at least one memory including the computer program code is configured with the at least one processor to cause the apparatus to establish more than one connection with the Access Network Discovery and Selection Function of a core network.

10. The apparatus of claim 1, where the at least one memory including the computer program code is configured with the at least one processor to cause the apparatus to communicate with other apparatuses serving a same vehicle or operationally connected vehicles regarding the status of one or more backhaul connections of the apparatuses.

11. The apparatus of claim 1, where the at least one memory including the computer program code is configured with the at least one processor to cause the apparatus to transmit using the first connection a scheduled non-cellular communication in addition to the control signalling required to control and manage the first connection, the second connection, and the non-cellular wireless service.

12. An apparatus, comprising:
at least one processor; and
at least one memory including computer program code, the at least one memory and the computer program code configured to, with the at least one processor, cause the apparatus at least to perform:
controlling the establishment of a network connection to a relay node;
controlling the setup of a first connection with the relay node to provide a cellular connection with a primary radio access network of a donor cellular system supporting cellular wireless service access relays;
controlling the setup of a second connection with the relay node to provide a mobile backhaul connection with a radio access network of a donor cellular system;
the second connection providing the mobile backhaul connection for the non-cellular wireless service; and
the first connection carrying control signalling required to control and manage the first connection, the second connection, and the non-cellular wireless service.

13. The apparatus of claim 12, wherein the first connection with the donor cellular system and the relay node provides a backhaul connection for the cellular wireless service provided by the relay node.

14. The apparatus of claim 12, where the at least one memory including the computer program code is configured with the at least one processor to cause the apparatus to control the setup of the first connection and the second connection with radio access networks using different radio access technologies.

15. The apparatus of claim 12, where the at least one memory including the computer program code is configured with the at least one processor to cause the apparatus to control the setup of the first connection and the second connection with donor cellular systems of different operators.

16. The apparatus of claim 12, wherein the primary radio access network is a Long-Term Evolution (LTE) or Long-Term Evolution-Advanced (LTE-A) network.

17. The apparatus of claim 12, where the at least one memory including the computer program code is configured with the at least one processor to cause the apparatus to maintain more than one connection with the relay node.

18. The apparatus of claim 12, where the at least one memory including the computer program code is configured with the at least one processor to cause the apparatus to
maintain a connection with more than one relay node serving a same vehicle or operationally connected vehicles.

19. The apparatus of claim 18, where the at least one memory including the computer program code is configured with the at least one processor to cause the apparatus to provide coordination and control of more than one relay node serving the same vehicle or the operationally connected vehicles by communicating with other network elements of one or more core networks.

20. An apparatus, comprising:
means for controlling the establishment of a network connection to a relay node;
means for controlling the setup of a first connection providing a cellular connection with the relay node and a primary radio access network of a donor cellular system supporting cellular wireless service access relays;

means for controlling the setup of a second connection providing a mobile backhaul connection with the relay node and a radio access network of a donor cellular system;

the second connection providing the mobile backhaul connection for a non-cellular wireless service; and the first connection carrying control signalling required to control and manage the first connection, second connection, and the non-cellular wireless service.

21. A method, comprising:

controlling a relay node to provide a non-cellular wireless service;

setting up and maintaining, by the relay node, a first connection providing a cellular connection with a primary radio access network of a donor cellular system supporting cellular wireless service access relays;

setting up and maintaining, by the relay node, a second connection providing a mobile backhaul connection with a radio access network of a donor cellular system;

the second connection providing the mobile backhaul connection for the non-cellular wireless service; and the first connection carrying control signalling required to control and manage the first connection, the second connection, and the non-cellular wireless service.

22. The method of claim 21, further comprising: controlling the relay node to provide the cellular wireless service and providing with the first connection a mobile backhaul connection for the cellular wireless service.

23. The method of claim 21, further comprising: setting up the first connection and the second connection with radio access networks using different radio access technologies.

24. The method of claim 21, further comprising: setting up the first connection and the second connection with donor cellular systems of different operators.

25. The method of claim 21, wherein the primary radio access network is a Long-Term Evolution (LTE) or Long-Term Evolution-Advanced (LTE-A) network.

26. The method of claim 21, further comprising:

suspending the second connection for a given time period by releasing and re-establishing the connection; and buffering the uplink data of the non-cellular wireless service at the relay node during the given time period.

27. The method of claim 21, further comprising: transmitting at least part of traffic of the mobile relay non-cellular wireless service using the first connection.

28. The method of claim 21, further comprising: communicating with the Access Network Discovery and Selection Function of a donor cellular system for controlling the activation, reactivation and setup of the connections of the apparatus with donor cellular systems.

29. The method of claim 28, further comprising:

establishing more than one connections with the Access Network Discovery and Selection Function of a core network.

30. The method of claim 21, further comprising:

communicating with other apparatuses serving a same vehicle or operationally connected vehicles regarding the status of one or more backhaul connections of the apparatuses.

31. A computer program comprising program code means adapted to perform steps of claim 21 when the program is run on a computer.

32. An article of manufacture comprising a non-transitory computer readable medium and embodying program instructions thereon executable by a computer Operably coupled to a memory which, when executed by the computer, perform steps of claim 21.

33. A method, comprising:

controlling the establishment of a network connection to a relay node;

controlling the setup of a first connection with the relay node and providing a cellular connection with a primary radio access network of a donor cellular system supporting cellular wireless service access relays;

controlling the setup of a second connection providing a mobile backhaul connection with the relay node and a radio access network of a donor cellular system;

the second connection providing the mobile backhaul connection for a non-cellular wireless service; and the first connection carrying control signalling required to control and manage the first connection, the second connection, and the non-cellular wireless service.

34. The method of claim 33, wherein the first connection with the donor cellular system and the relay node provides a backhaul connection for the cellular wireless service provided by the relay node.

35. The method of claim 34, wherein the primary radio access network is a Long-Term Evolution (LTE) or Long-Term Evolution-Advanced (LTE-A) network.

36. The method of claim 33, further comprising: controlling the setup of the first connection and the second connection with radio access networks using different radio access technologies.

37. The method of claim 33, further comprising: controlling the setup of the first connection and the second connection with donor cellular systems of different operators.

38. The method of claim 33, further comprising: maintaining more than one connection with the relay node.

39. The method of claim 33, further comprising: maintaining a connection with more than one relay node serving a same vehicle or operationally connected vehicles.

40. The method of claim 39, further comprising: providing coordination and control of more than one relay node serving the same vehicle or the operationally connected vehicles by communicating with other network elements of one or more core networks.

* * * * *